United States Patent [19]

Kuipers

[11] Patent Number: 4,848,247
[45] Date of Patent: Jul. 18, 1989

[54] UNITARY PALLET

[75] Inventor: Sytze A. Kuipers, Franeker, Netherlands

[73] Assignee: Lankhorst Recycling B.V., Sneek, Netherlands

[21] Appl. No.: 141,840

[22] Filed: Jan. 11, 1988

[30] Foreign Application Priority Data

Jan. 12, 1987 [NL] Netherlands .......................... 8700047

[51] Int. Cl.⁴ .............................................. B65D 19/44
[52] U.S. Cl. .................................. 108/52.1; 108/53.1; 108/55.3; 108/901
[58] Field of Search ....................... 108/53.3, 901, 902, 108/52.1, 53.1, 55.1, 55.3, 53.5, 56.1, 56.3

[56] References Cited

U.S. PATENT DOCUMENTS

| | | | |
|---|---|---|---|
| 3,524,415 | 8/1970 | Heiman | 108/55.1 X |
| 3,561,375 | 2/1971 | Hammond | 108/901 X |
| 3,580,190 | 5/1971 | Fowler | 108/901 X |
| 3,638,586 | 2/1972 | Elshout | 108/901 X |
| 3,699,902 | 10/1972 | Allgeyer et al. | 108/901 X |
| 3,759,194 | 9/1973 | Fujii et al. | |
| 3,814,031 | 6/1974 | Fowler | |
| 3,868,915 | 3/1975 | Hafner | 108/901 X |
| 3,916,803 | 11/1975 | Garcia | 108/55.3 X |
| 3,921,540 | 11/1975 | Melnick et al. | 108/55.1 |
| 4,051,787 | 10/1977 | Nishitani et al. | 108/901 X |
| 4,263,855 | 4/1981 | Lawlor | 108/53.3 |

FOREIGN PATENT DOCUMENTS

| | | |
|---|---|---|
| 677412 | 3/1966 | Belgium . |
| 2100763 | 8/1972 | Fed. Rep. of Germany . |
| 2425401 | 12/1975 | Fed. Rep. of Germany . |
| 1559844 | 3/1969 | France . |
| 1582978 | 10/1969 | France . |
| 2009569 | 2/1970 | France . |
| 2112567 | 6/1972 | France . |
| 2563495 | 10/1985 | France . |
| 67432 | 4/1973 | Luxembourg . |
| 514476 | 12/1971 | Switzerland . |

Primary Examiner—Peter A. Aschenbrenner
Assistant Examiner—Thomas A. Rendos
Attorney, Agent, or Firm—Fleit, Jacobson, Cohn & Price

[57] ABSTRACT

A one-piece or unitary synthetic plastics pallet, in particular suitable for crates, comprising an upper deck and a lower deck connected thereto by means of spacers. The upper deck is substantially closed and the spacers consist of tubular members that are open at the side of the lower deck and which are positioned between lower deck and upper deck at such an interspace that from any of the sides of the pallet, the fork prongs of a pallet lifting and/or conveying device can be pushed between the lower deck and the upper deck.

10 Claims, 2 Drawing Sheets

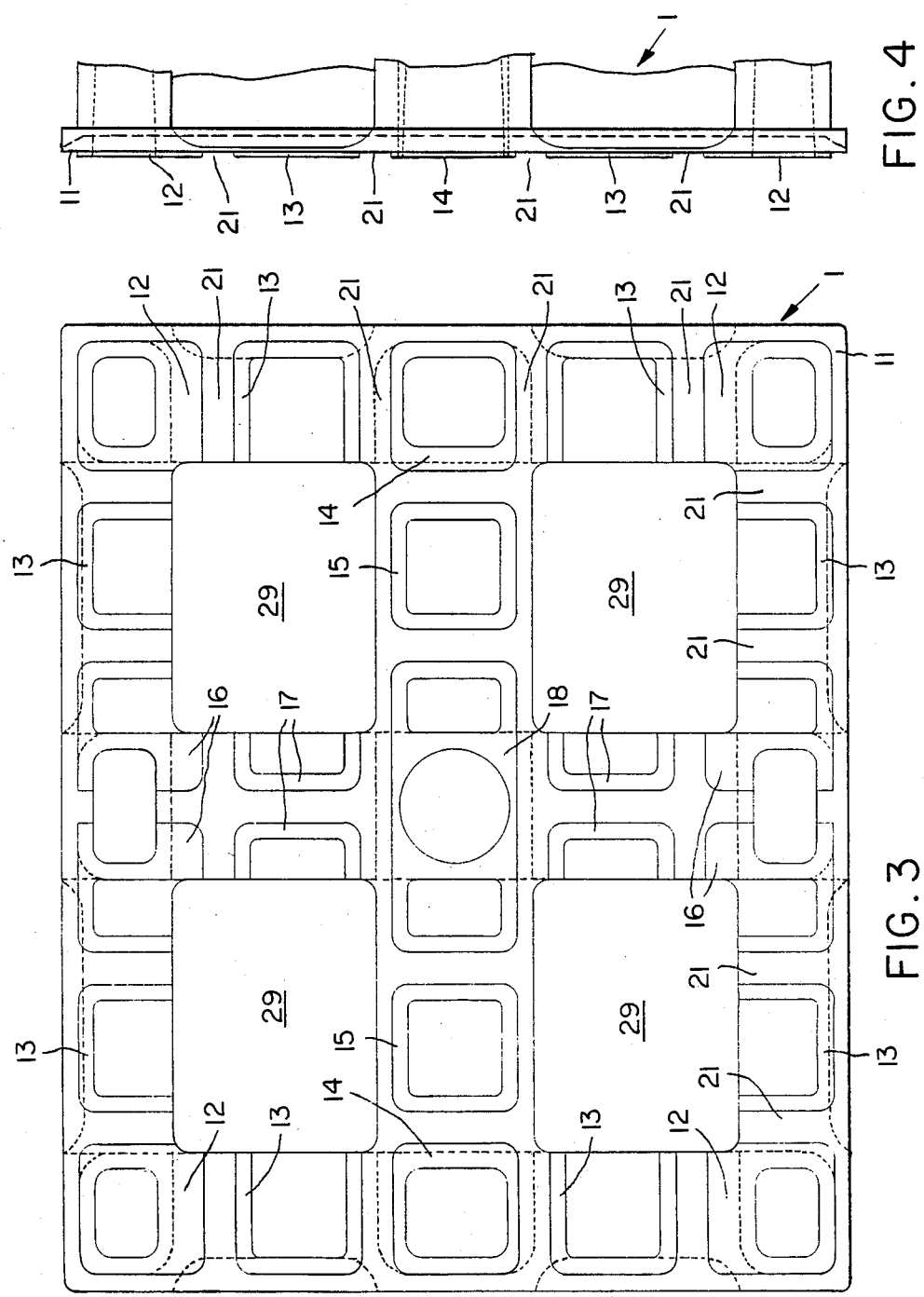

UNITARY PALLET

This invention relates to a one-piece or unitary synthetic plastics pallet suitable in particular for crates, comprising an upper deck and a lower deck connected thereto through spacers.

Synthetic plastics pallets are known per se and are frequently used in the food industry, among other fields, e.g. for the storage and the transport of crates.

Most of the known synthetic plastics pallets are not made in one piece or have no lower deck.

One drawback of such non-unitary synthetic plastics pallets is that the different parts should be made separately and subsequently be attached to each other somehow. The manufacture of such pallets, consequently, is complicated, while the connections between the various parts form weak spots and/or require additional material.

Thus, for instance, Dutch patent application No. 66,02817 discloses a synthetic plastics pallet comprising a loose upper deck and a loose lower deck, which decks are attached to one another by means of loose intermediate pieces. Moreover, both the upper deck and the lower deck consist, in their turn, of two parts made separately and subsequently welded to one another.

U.S. Pat. No. 3,814,031 discloses a unitary synthetic plastics pallet which has no lower deck, however. For many applications, e.g. when the loaded pallets should be stackable, a lower deck is necessary, however.

Unitary synthetic plastics pallets are also known per se. For instance, Swiss Pat. No. 514,476 discloses a synthetic plastics pallet consisting of a hollow body formed by rotational moulding and having tunnels for receiving the lifting members of a forklift truck. A drawback of such a pallet is that its manufacture is possible by rotational moulding only, resulting in relatively slight wall thicknesses and hence in a relatively low strength and/or very complicated structure.

Such a construction does not permit to provide recesses in the lower deck either, enabling the use of a so-called pallet truck. A pallet truck is a truck having a forked frame, with the fork prongs being provided at the ends with let-down wheels.

Dutch patent application No. 73,0657, finally, discloses a unitary pallet formed likewise as a seamless, closed hollow body by rotational moulding. The hollow body, however, is filled with a filling medium in a second manufacturing stage in order to impart sufficient strength to the pallet. Dutch application No. 73,06357 mentions compressed air or foam plastics as a filling medium. In the latter case, after curing of the filling foam, recesses can be made to receive the fork prongs of a forklift truck. However, these considerably detract from the strength of the pallet. The pallet known from Dutch application No. 73,06357 is unsuitable for being handled by means of a pallet truck.

Consequently, there is a need for a unitary synthetic plastics pallet having an upper and a lower deck and which is nevertheless suitable for being handled both by a forklift truck and a pallet truck.

It is an object of the present invention to satisfy this need and in general to provide an effective and strong pallet of synthetic plastics having a long life.

To that end, according to the present invention, a pallet of the above described type is characterized in that the upper deck is substantially closed and that the spacers consist of tubular sections open at the end adjacent to the lower deck and which are placed at such an interspace between lower deck and upper deck that, from any of the sides of the pallet, the fork prongs of a pallet lifting and/or conveying device can be pushed between the lower deck and the upper deck.

One embodiment of the present invention will now be described, by way of example, with reference to the accompanying drawings, in which:

FIG. 3 is a bottom view of the pallet shown in FIGS. 1 and 2; and

FIG. 4 is a side view of the pallet shown in FIG. 3.

Figure 2:
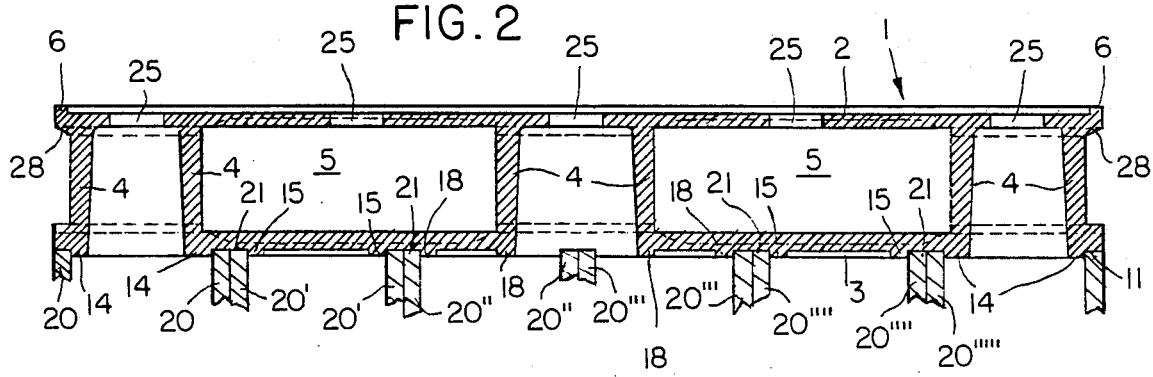
FIG. 2 is a cross section on the line II—II of FIG. 1.

The pallet 1 shown is designed for crates and comprises an upper deck 2, a lower deck 3 and spacers 4,4' intermediate upper deck 2 and lower deck 3. Upper deck 2, lower deck 3 and the interspaced spacers enclose cavities 5 into which fork prongs of a pallet truck or forklift truck or the like can be introduced for lifting and transporting the pallet 1. Preferably, all parts defining the cavities 5 of the pallet are slightly rounded or beveled to simplify the insertion of the forks of the warehouse truck. Spacers 4, as shown in FIG. 2, furthermore are disposed preferably slightly inwardly relatively to the outer circumference of upper deck 2 and lower deck 3. This has the advantage that when a shrink wrapping is applied about a part of the pallet and the goods stacked thereon, said wrapping may adhere, during the shrinking, around the edge of the upper deck 2 also adjacent spacers 4.

Upper deck 2 is provided peripherally with an upright edge 6. The opposite edge portions 6 of upper deck 2 are interspaced in such a manner that one or more crates fit exactly between said edge portions. The circumferential edge of the outer crates of a tier arranged in a certain pattern will thus be contiguous with the edge 6 of upper deck 2. Edge 6 ensures a secure and stable positioning of the crates to be placed on the upper deck and likewise of further tiers of crates to be placed on the lower tier of crates so that an entirely stable stack is obtained. Edge 6 also prevents the crates placed on upper deck 2 from sliding off, e.g. in the case of an emergency stop of a vehicle transporting the pallets.

Although not shown, upper deck 2 may be provided, in addition to upright edge 6 or instead of upright edge 6, with a different moulding which reinforces the entire stability and positioning. A good stability and positioning can be obtained when the moulding is built up segment by segment and each segment conforms to the contour of the units to be placed on the upper deck, e.g. crates. A moulding oriented substantially to a specific load, however, considerably restricts the general applicability of the pallet. Preferably, the moulding is such that the stability and the correct positioning of several types of units, e.g. crates, of different sizes, is ensured. For instance, it is possible to position on pallet 1 shown as an example, whose upper deck 2 is provided only with the upright edge 6, both beer crates and soft drink crates in a stable manner, as long as the sum of the lengths and widths of the crates placed between the opposite edge portions 6 is equal to the interspace between said edge portions 6.

It will furthermore be clear that mouldings designed for different specific units can be combined without hindering each other when being used, thereby producing a multifunctional moulding on the upper deck of the pallet. Lower deck 3, in the embodiment shown, also has a moulding, which is such that a receding edge or recess 11 is formed along the circumference of the lower deck. When two empty pallets are stacked, the upright edge 6 of upper deck 2 of the lower pallet falls into recess 11 of the lower deck of the upper pallet in such a manner that the respective parts of the two pallets are nested together, thus ensuring a stable stacking of the empty pallets.

The moulding of lower deck 3, in the embodiment shown, has a segmentary build-up and is formed by a plurality of segments 12, 13, 14, 15, 16, 17 and 18 formed, positioned and combined in such a manner that the segmentary build-up of the moulding conforms to the top of crates stacked into a tier in a certain pattern. The segments in this embodiment are formed so that the segments 12-18 fall within the circumferential edge of the upright walls 20,20' . . . (see FIG. 1) of the crates. The pallet can thus sink into the crates somewhat, thereby producing a stable, shape-conforming connection between the pallet and the tier of crates. The crates are thus supported laterally against each other thereby preserving the bond in the tier of crates. The adjoining circumferential edges of the upright walls 20,20',20" . . . of the various crates jointly fall into slots 21 bounded by the moulding segments. The circumferential edges of the upright walls of the outer crates bounding the tier of crates fall into recess 11. Such an moulding ensures a good and stable link-up of a pallet with a tier of crates on which the pallet is placed. The moulded pallets ensure a stable and accurate positioning of the crates on the pallet and of pallets, whether loaded or not, mutually. By virtue of the stable and accurate positioning of the crates and of the loaded pallets mutually, there is less risk of damage or breakage of the load, resulting in a uniform distribution of the load on the pallets. The pallets therefore need no longer be overdimensioned, while on the other hand the degree of packing of the pallets can be increased. The moulded pallets, moreover, prevent misalignment of the stacked, loaded pallets so that the stack of pallets is less apt to become top-heavy and hence more loaded pallets can be stacked.

Preferably, the pallets are made of synthetic plastics material obtained by recycling plastics waste. The pallets can thus be made of relatively heavy constructions at relatively low cost. Upper deck 2 contains through holes 25 for ventilation through the pallet of the goods stacked thereon. Such vent holes can also be used very wel when products deep-frozen or, conversely, to be heated are transported on the pallets so that cooling air or heated air can circulate optimally through the loading space along the products. The holes moreover provide a substantial saving in weight. During the manufacture of the pallets, the holes furthermore have a shrinkage-limiting effect.

The spacers 4,4' connecting the upper deck and the lower deck are tubular members having, in this embodiment, a cross section at least the outer circumference of which is approximately rectangular, with corners rounded in suitable places.

Figure 1:
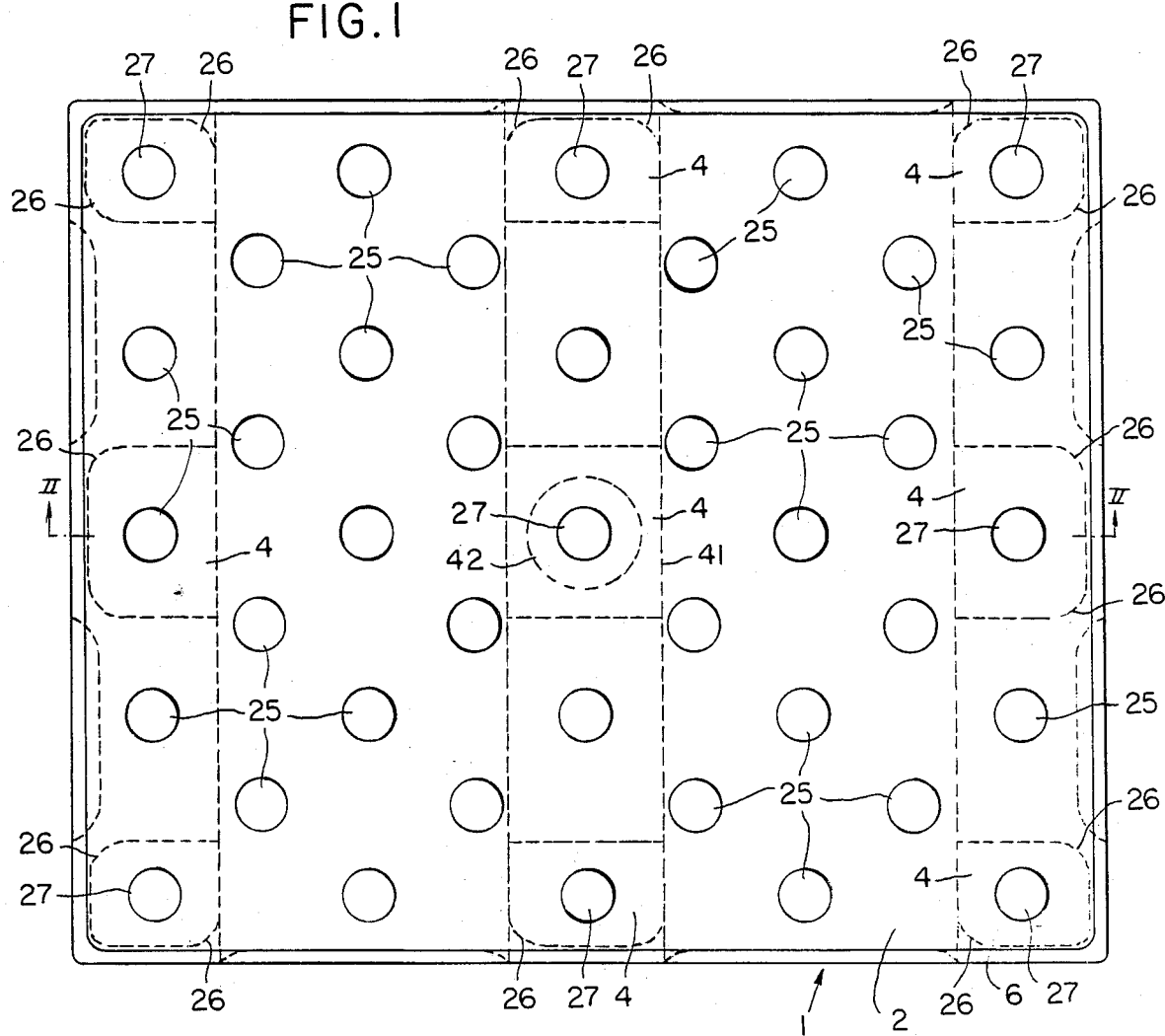
FIG. 1 is a diagrammatic top view of an embodiment of a pallet to the present invention.

The spacers are present at the four corners of the pallet and furthermore in the middle of each side of the pallet and in the centre of the pallets, as shown in FIG. 1. The corners of the tubular members forming the spacers, facing the exterior of the pallet, are rounded, as indicated at 26, so that the fork prongs of a platform truck and/or lifting truck can be easily inserted between the decks and between the spacers.

For the same purpose, preferably the edges of the lower deck and the upper deck are beveled at least adjacent the insertion holes 5, as shown by way of example in FIG. 2 for the upper deck at 28.

The tubular spacers are entirely open at the lower end and, as shown in FIG. 2, have a ready-release form for mould portions to be removed towards the lower end during the manufacture.

At the top, each spacer is substantially closed, but the upper deck at that location is provided also with holes 27, having the same function as the earlier described holes 25 and which likewise effect that the spacers can be properly cleaned internally.

As shown in FIG. 3, the lower deck is formed by wide strips extending along the edges of the lower deck and further including a cross situated within the edge strips. The strips form connections between the spacers and leave four symmetrically positioned openings 29 clear. As a result of this configuration, there is obtained a solid and heavily loadable lower deck, which nevertheless offers the possibility to manipulate the pallet with a pallet truck.

Also, neither openings 29 nor insertion holes 5 form weakening perforations in the walls of the basically closed hollow spaces. The pallets according to the present invention, consequently, need not be manufactured by rotational moulding but can be made e.g. by injection moulding.

It is observed that, after reading the above, various modifications will become readily apparent to those skilled in the art. For instance, mouldings 12-18 on the lower deck are shown in FIG. 3 as continuous ribs. However, it is also possible to use a suitable pattern of e.g. flat, round lugs or rectangular lugs, possibly with rounded corners.

Furthermore, the cross-sectional form of the inner wall of the tubular members forming the spacers need not be similar to that of the outer wall. For instance, the central spacer 4' in the embodiment shown has a rectangular outer circumference 41 and a circular inner circumference 42.

Such modifications are deemed to fall within the scope of the present invention.

I claim:

1. A unitary synthetic plastics pallet, in particular suitable for crates, comprising:
   an upper deck,
   a lower deck,
   spacers integrally formed with and extending between said upper and said lower deck,
   a beveled outer edge provided on at least one of said upper and lower decks at a side thereof facing the other of said upper and lower decks,
   an upright circumferential edge provided peripherally on said upper deck,
   a recessed circumferential edge formed along the circumference of said lower deck,
   the upper deck being substantially closed, the spacers consisting of tubular members that are open at the side of the lower deck and which are positioned between the lower deck and upper deck to space said lower deck from said upper deck so that from any of the sides of the pallet, the fork prongs of a pallet lifting and/or conveying device can be pushed between the lower deck and the upper deck, wherein the lower deck is formed from edge strips forming a rectangle and cross strips intersecting each other and connecting the central portions of opposite edge strips, said edge strips and cross strips forming four openings in the lower deck situated symmetrically relatively to the centre of the pallet, and wherein said spacers recede with respect to said upright edge of said upper deck.

2. A pallet as claimed in claim 1, characterized in that the spacers are provided at each corner of the pallet, adjacent the middle of the sides of the pallet and in the centre of the pallet.

3. A pallet as claimed in claim 1, characterized in that the upper deck contains a pattern of holes, at least one hole being provided adjacent a spacer.

4. A pallet as claimed in claim 1, characterized in that at least one of the tubular members, in cross section, has a round inner circumference.

5. A pallet as claimed in claim 1, characterized in that the upper deck is provided at its top with a moulding adapted to coact with goods to be placed on the upper deck for their positioning.

6. A pallet as claimed in claim 5, characterized in that the moulding consists of segments.

7. A pallet as claimed in claim 5, characterized in that the moulding consists of flat lugs.

8. A pallet as claimed in claim 1, characterized in that the lower deck is provided at its bottom with a moulding adapted to coact with goods placed on a subjacent pallet.

9. A pallet as claimed in claim 8, characterized in that the moulding consists of segments.

10. A pallet as claimed in claim 8, characterized in that the moulding consists of flat lugs.

* * * * *